United States Patent [19]

Black et al.

[11] 4,253,343
[45] Mar. 3, 1981

[54] BELT DRIVE SYSTEM WITH ADJUSTABLY GAUGED TIGHTENER MEANS

[75] Inventors: Robert D. Black, Ottumwa, Iowa; Rodney G. Koertner, Auburn, Wash.

[73] Assignee: Deere & Company, Moline, Ill.

[21] Appl. No.: 56,367

[22] Filed: Jul. 10, 1979

[51] Int. Cl.³ .............................................. F16H 7/12
[52] U.S. Cl. ..................................... 474/135; 34/118; 198/813; 198/814
[58] Field of Search .............. 74/242.11 R, 242.11 C, 74/242.15 R; 34/118; 198/813, 814

[56] References Cited

U.S. PATENT DOCUMENTS

| | | | |
|---|---|---|---|
| 1,582,322 | 4/1926 | Warren | 74/242.11 R |
| 2,795,135 | 6/1957 | Kremser | 74/242.11 R X |
| 2,806,382 | 9/1957 | Gehrke | 74/242.11 R |
| 3,330,049 | 7/1967 | Helton | 34/118 X |
| 3,623,378 | 11/1971 | Stanford | 34/133 |
| 3,965,768 | 6/1976 | Foster | 74/242.11 R |

*Primary Examiner*—C. J. Husar
*Assistant Examiner*—Conrad Berman

[57] ABSTRACT

A belt drive system featuring an adjustable belt tightener including coordinated gauge means for designating the proper belt tension according to changing positions of the belt tightener as the belt stretches during operation of the drive.

10 Claims, 4 Drawing Figures

BELT DRIVE SYSTEM WITH ADJUSTABLY GAUGED TIGHTENER MEANS

BACKGROUND OF THE INVENTION

Various types of machinery and equipment employ, in one form or another, a belt drive system in which a belt, trained about two pulleys, serves as the means for transmitting the drive. Typically, such a drive will utilize a third pulley engaging the belt as a belt tightener to keep the belt properly adjusted so as to avoid slippage. It is commonplace to use a spring or other biasing means acting against the tightener idler to tension the belt. One of the problems with this type of drive is that the belt increases in length because of extended use, and consequently, the biasing means must be adjusted to compensate for this by repositioning of the idler. In a simple form of drive, an adjusting screw will be used to increase the biasing force and the mechanic making the adjustment may rely on "feel" as to a properly adjusted belt. It is also known to provide specifications that teach that the belt is properly adjusted when a certain amount of "give" can be detected along one run of the belt. Further, it is known to measure the amount of biasing force by a scale or the like and to indicate that a certain reading on the scale indicates proper adjustment of the drive.

All of these prior means and methods leave too much to conjecture and result in excessive belt wear, over- or under-tensioning and loss of efficiency. According to the present invention, these and other problems are solved by a simple and efficient system employing a pair of coordinated gauge means, one to indicate the position of the idler and the other to indicate the biasing force. The gauge means are so correlated that a certain reading on one gauge will indicate what reading should be attained on the other gauge, all of which is accomplished by making one adjustment which produces proper idler position according to biasing force. The readings are made easier by using identical indicia on the gauge means, preferably numerical and linear, so that when, for example, the number 2 on one gauge appears, the system is properly adjusted when the number 2 appears on the other gauge means. Further improvements are provided by arranging the components in a compact manner, easily accessible to the machine operator and occupying no unnecessary space.

BRIEF SUMMARY OF THE INVENTION

The improved drive comprises, briefly and specifically, a pair of drive pulleys about which a belt is trained, which belt is tensioned by a third or idler pulley biased in a belt tightening direction by an adjustable spring. First and second gauge means cooperate respectively with the idler and the adjusting means to show, respectively, the position of the idler and the amount of force on the biasing means. When adjustment is required, the two readings will be inconsistent. Proper adjustment is achieved by applying spring force until the readings are consistent. It is contemplated that the adjustment can be simply made by a convenient hand tool, such as a wrench, and the gauge means are easily and clearly visible to the mechanic making the adjustment.

DESCRIPTION OF THE PREFERRED EMBODIMENTS

The background structure chosen for purposes of illustration and description is that of a forage harvester, an agricultural machine for accomplishing the harvesting of crops, the subsequent reduction of crops and the delivery thereof to a trailing vehicle (not shown). A superior type of belt drive is a requisite in a machine of this type because of the high speeds and horsepower consumption, and it is important that all adjustments be accurately made and, what is also significant, is that the adjustments be easily made with a minimum of "down time" in the field. The invention is not, however, to be construed as limited to machines of this type.

Figure 1:
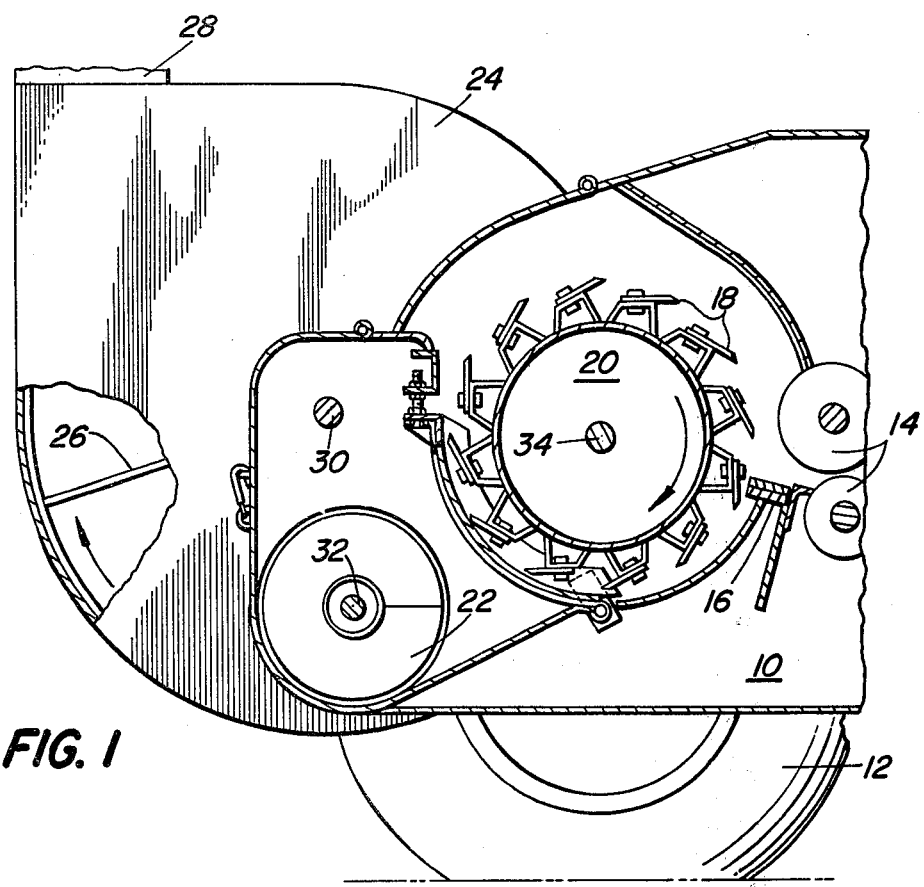
FIG. 1 is a partial view of the rear part of a forage harvester with shielding removed and portions broken away to reveal inner structure which may be used with this invention.
Figure 4:
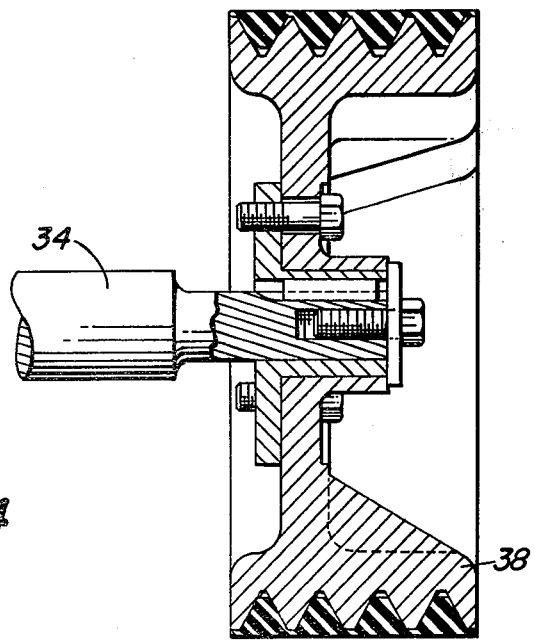
FIG. 4 is an enlarged sectional view of one of the drive pulleys or sheaves.
Figure 3:
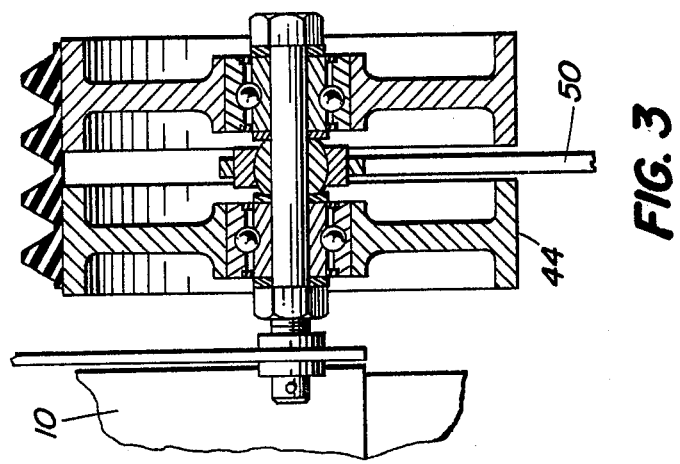
FIG. 3 is an enlarged sectional view of the idler.

Referring to FIG. 1, the rear part of the machine comprises a wheeled frame, represented by a housing 10 supported on a pair of wheels (only one of which is shown at 12). The machine is conventionally drawn by a tractor (also not shown) for travel in the direction toward the viewer's right. Crop which is harvested as the machine progresses over the field reaches a pair of feed rolls 14 which feed the crops to the rear across a fixed knife 16 and thus into the path of knives 18 on a rapidly rotating cutterhead 20, the direction of rotation of which is designated by the arrow in FIG. 1. The crops, now reduced, moves downwardly and to the rear to be received by a transverse auger 22 which in turn feeds the crops into a blower housing 24 at the opposite side of the machine. The blower carrier a fan 26 which travels clockwise to propel the crops upwardly through a discharge spout 28 which curves upwardly and rearwardly in a conventional manner (not shown) for discharge into a trailing wagon or the like (also not shown). The fan is fixed to the remote end of a fan shaft 30. This shaft, as well as an auger shaft 32 and cutterhead shaft 34 extend in parallelism across the rear part of the machine. Power is brought into the left end of the cutterhead shaft by conventional means (not shown) and the right hand (near as regards the viewer) of the cutterhead shaft has fixed thereto a pulley or sheave 38 (FIGS. 2, 4), preferably of the multiple-V type, as is a sheave pulley 40 affixed to the corresponding end of the fan shaft 30. A drive belt 42, here of the multiple-V type having a flat exterior, is trained about the two sheaves and is tensioned by a belt tightening means in the form of a split idler pulley 44 (FIGS. 2, 3) journaled on a shaft 46 parallel to the fan and cutterhead shafts. The particular form of idler shown here forms no part of the present invention but rather is the subject matter of assignee's copending applications filed concurrently with this application.

Idler 44 is arranged so that it engages the under run or stretch of the belt from below and its belt tightening movement or positioning is toward the upper run or stretch of the belt, an arrangement chosen for its advantages of compactness, efficiency and simplicity. The idler is part of a belt tightening means including a carrier in the form of a bell crank 47 pivoted to the support means or housing at 48 and having a first rearwardly extending arm 50 and a second depending arm 52. Rocking of the bell crank in a clockwise direction causes movement of the idler in its tightening direction, in which direction it is biased by biasing means 54 which includes a coiled tension spring 56, a connecting element 58 and an adjusting means in the form of a screw 60. The screw connects the element to the support means 10 via a bracket 62.

When the machine leaves the factory, the drive is properly adjusted as to belt tension, etc. It will be understood that as the machine is operated over extended periods of time, the belt will stretch and the amount of spring force put in at the factory will not be sufficient to maintain proper tension. Obviously, the belt may be tensioned by effecting an adjustment of the biasing means 54, but there remains the problem of whether the adjustment is correct under the existing operating conditions. If the tension is too little, belt slippage and premature wear occur. Over-tensioning causes excessive loads on the bearings and increases the tendency of the belt to stretch.

Figure 2:
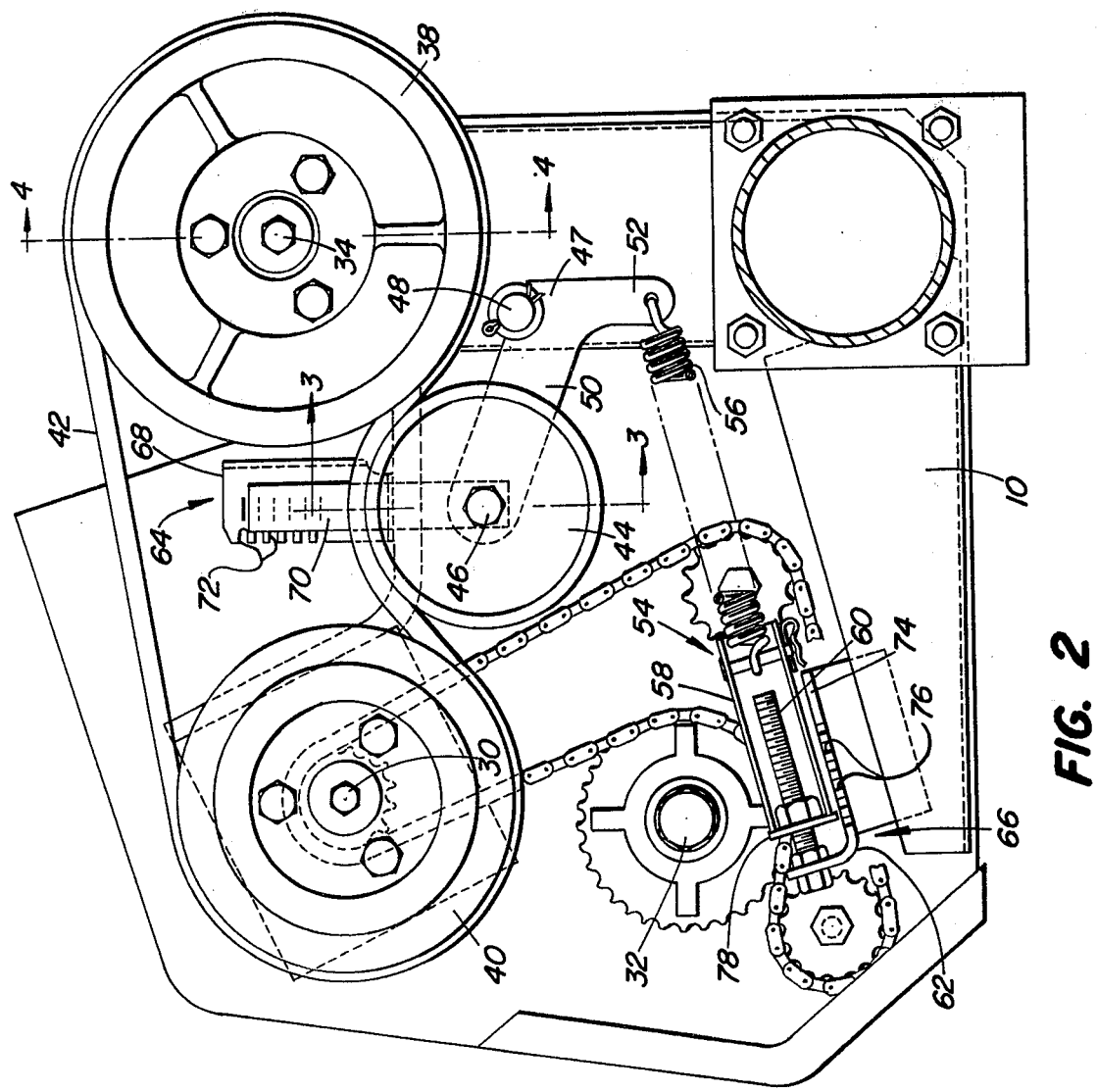
FIG. 2 is an enlarged view of an outer portion of the structure shown in FIG. 1.

According to the present invention, determination of the proper belt tension may be readily and easily effected, quickly and with a minimum of effort and tools. As shown in FIG. 2, this is achieved by the provision of a first gauge means 64 for the idler 44 and a second gauge means 66 for the biasing means. The first gauge means or scale includes a pair of cooperating members, one of which is a member 68 affixed to the near side of the housing 10 and here shown as being substantially vertically disposed in accordance with the general range of movement of the idler. The second member 70 is carried by the idler shaft 46 and, as the idler shaft moves up and down, the member 70 moves closely up and down alongside the member 68, the latter of which is provided with indicia, here in the form of a linear scale of easily visible notches 72, preferably numbered from bottom to top from 1 through 6. Thus, the end of member 70 serves as an indicator which may be read against a notch to show the existing position of the idler according to the existing biasing force on the bell crank 47.

The second gauge means is similarly constructed, comprising a member 74 affixed to the near side of the housing 10, preferably as part of the bracket 62 previously described in connection with the biasing means 54. Member 74 bears indicia in the form of a linear scale of notches 76 numbered 1 through 6 from front to rear. An end member 78 on the spring connecting element 54 serves as an indicator readable against the notches or indicia 76.

Both gauge means are preferably identical for ease of readability. The nature of the belt (as to load-transmitting capacity, etc.), the type and strength of the spring and the positioning of both gauge means are easily calculated to establish identity between both gauge means so that when, for example, both gauge means reveal the number 2, belt tension is correct for existing conditions, and, as the belt stretches, repositioning of the idler and increased force on the spring will require readjustment until, for example, both gauges read at the number 3 and so on.

By way of illustration of the calculations necessary to practice this invention, the following steps are generally necessary:

(i) Belt 42, pulleys 38, 40, 44 and the proper tension in belt 42 are selected in accordance with power requirements of the drive system. Belt tension is preferably the same throughout belt elongation.

(ii) A scale 72 is selected corresponding to the position of idler 44 over the full range of belt elongation necessary to generate the belt tension selected in step (i). As idler 44 is pivoted into belt 42, the force on idler 44 must be increased to generate a constant tension in belt 42 because with the changing direction of application of the idler force, a decreasing proportion of the idler force is applied as a force component on belt 42.

(iii) The force which must be exerted on idler 44 to cause it to assume positions corresponding to scale 72 is calculated.

(iv) The requirements and geometry for bell crank 47 and spring 56 to apply the required forces on idler 44 (calculated in step (iii)) are calculated and selected.

(v) The scale 72 for spring 56 is selected. As illustrated, the selections of step (iv) have been chosen such that those scales are identical, although they need not be. All that is required is that there is an easily made comparison between those scales for simplicity of adjustment to compensate for belt elongation.

It will be understood that what has been disclosed here is a preferred embodiment. The indicia need not, for example, be linear. Different colors rather than numerals could be employed as indicia. The idler could be arranged to move in an opposite direction. These and other variations could be made without departure from the spirit of the invention.

We claim:

1. In a belt drive system having support means, first and second parallel shafts journaled on the support means, first and second pulleys fixed respectively on the first and second shafts, a drive belt means trained about the pulleys, belt tightening means engaging a run of the belt and mounted on the support means for selective positioning to tension the belt between the pulleys, biasing means operative between the support means and the belt tightening means for urging the latter in a belt tightening direction, and means for adjusting the biasing means to vary the force thereon, the improvement comprising: first gauge means including a pair of members carried respectively by the support means and the belt tightening means, one of said members bearing indicia and the other having an indicator readable on the indicia to show the position of the belt tightening means, and the second gauge means including a second pair of members carried respectively by the support means and the adjusting means, one of said second pair of members bearing indicia to show the state of adjustment of the biasing means, said two gauge means being so coordinated that the two readings may be compared to designate the proper force on the biasing means according to the position of the belt tightening means.

2. The improvement according to claim 1, in which the two indicia are identical so that when the index reading on one gauge means is the same as the index reading on the other gauge means, the belt tightening means is properly positioned according the biasing means force.

3. The improvement according to claim 1, in which the belt tightening means is a third pulley engaging one run of the belt in such manner as to urge that run toward the opposite run, and the first gauge means extends in the direction in which the third pulley urges the first-named run of the belt.

4. The improvement according to claim 1, in which the shafts are horizontally positioned, the belt tightening means includes a bell crank having first and second arms, one arm being transversely disposed relative to the shafts and carrying a third pulley engaging the belt and a second arm vertically disposed, and the biasing means is disposed transversely as respects the shafts and is connected to said second arm.

5. The improvement according to claim 1, in which the belt tightening means includes a third pulley and a carrier journaling the third pulley and movably mounted on the support means.

6. The improvement according to claim 5, in which the carrier is a lever arm and the biasing means is a tension spring connected to said lever arm.

7. The improvement according to claim 6, in which the adjusting means includes an element connected to the spring and an adjusting screw operative between the support means and the element to vary the spring force.

8. The improvement according to claim 1, in which each indicia comprises a series of spaced apart notches against which the respective indicators are readable.

9. The improvement according to claim 8, in which the series of notches are linear.

10. The improvement according to claim 9, in which the series of notches are identical.

* * * * *